2 Sheets—Sheet 1.
P. G. FINN.
CUTTER-HEAD.
No. 178,918. Patented June 20, 1876.
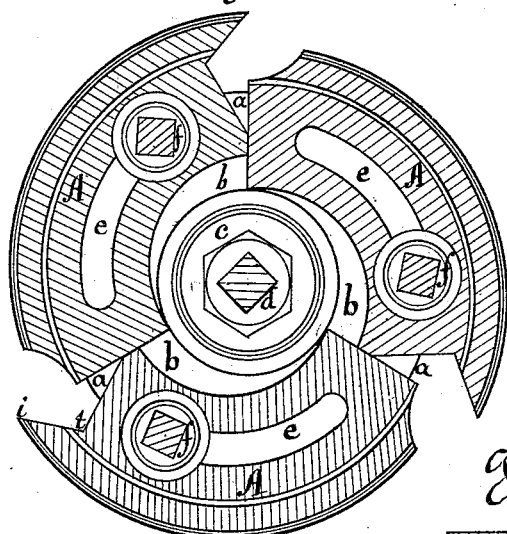
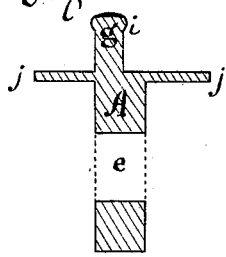
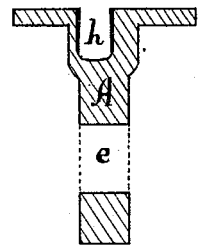
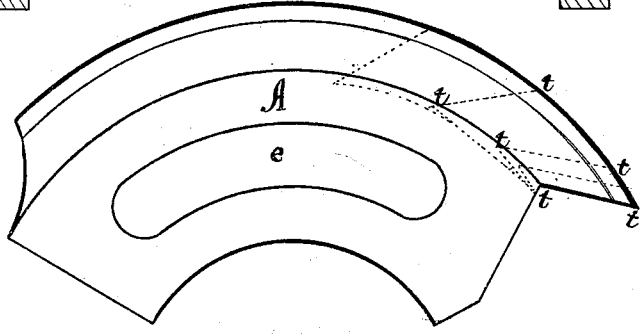
Witnesses
Inventor 2 Sheets—Sheet 2.

P. G. FINN.
CUTTER-HEAD.

No. 178,918. Patented June 20, 1876.

Witnesses

Inventor
Philander G. Finn
by Sturgeon & Hallock
attys.

N. PETERS, PHOTO-LITHOGRAPHER, WASHINGTON, D. C.

UNITED STATES PATENT OFFICE.

PHILANDER G. FINN, OF ERIE, PENNSYLVANIA.

IMPROVEMENT IN CUTTER-HEADS.

Specification forming part of Letters Patent No. 178,918, dated June 20, 1876; application filed March 22, 1876.

*To all whom it may concern:*

Be it known that I, PHILANDER G. FINN, of Erie, in the county of Erie, and State of Pennsylvania, have invented certain new and useful Improvements in Cutter-Heads; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to cutter-heads for what are known as sticking and matching machines; and, consists in, first, the form of the head; and, second, the form of the knives and their mode of attachment and adjustment; and third, in the relation of the two parts above-named to each other.

Figure 5:
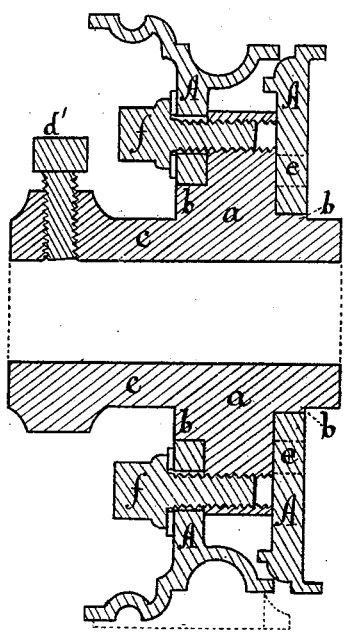
Figure 6:
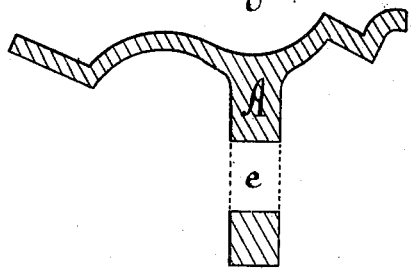

My device is shown in the accompanying drawing as follows:

Figure 1 is a plan view of my cutter-head. Fig. 2 is a plan view of a detached knife. Figs. 3 and 4 are transverse-section views of tonguing and grooving knives. Fig. 5 is a vertical section of the head, taken longitudinally through the hub. The head here shown is a double head, and has attached knives for cutting moldings. Fig. 6 is a section of a molding-knife. The shape of the cutting part of the knife makes no difference, as the body is the same in all cases. So, while I have shown various forms of knives, and the manner in which they may be arranged with relation to each other, one letter of reference, A, is used to designate a knife, no matter what its shape may be.

The knives shown in Figs. 1 and 3 are grooving-knives, and those shown in Figs. 2 and 4 are tonguing-knives; while, as before stated, those shown in Figs. 5 and 6 are for cutting moldings. The disk to which the knives are attached is marked $a$. The hub is lettered $c$, and the adjusting set-screws are lettered $d$ and $d'$. In these last-named parts there is in my device nothing new. The knives A are made circular—that is, the body of the knife has its front or outer and its inner faces made concentric, (see Fig. 2,) and the upper and lower faces of the body are flat. (See Figs. 3, 4, and 6.) Each knife has a concentric slot, $e$, extending nearly its entire length, through which passes the attaching screw-bolt $f$, by which the knives are firmly secured to the disk $a$. The inner faces of the knives set against eccentric projections from the hub. These are lettered $b\ b\ b$. The curve of these projections is concentric with the curve of the knives, and hence their faces and the adjoining faces of the knives present a continuous bearing; and as the knives wear away, as seen by dotted lines in Fig. 2 at $t\ t$, the cutting-point can be at as great a distance from the center of the head as when the knives are new, by pushing the knives upon the eccentric projections $b\ b$. From these dotted lines it will be seen that the knives can be used until nearly the whole cutting-face is worn away, and yet the bevel-line maintain the same angle to the radii of the blade or knife as when first used; and, as before stated, by pushing the shank-face upon the eccentric projection $b$, the radial distance of the cutting-point is always the same. The form of the knives being a part of a true circle, and when in position on the disk being placed, by reason of the eccentric projections, eccentrically to the same, no part of the knife but the cutting-point can touch or come in contact with the board; hence there will be no friction along the cutter, and yet the action of the cutters on the wood is like that of a plane-bit in an ordinary hand-plane.

As I have before stated, I have shown various forms of the cutting part of the knives; but it will be observed in all of them that the shank of the knife is always the same, and is always placed at right angles to the plane of motion of the cutter, and attached to the disk $a$ by set-screws or screw-bolts passing through the concentric slots $e$.

In Fig. 5 I have shown how my head may be made double, and carry on one side knives for cutting certain members of a molding, and on the other side certain other parts of the molding. The sectional line in this figure passes very near the cutter-point of the knives on the left side of the head; and hence through the highest part of the eccentric projections $b$ while it passes through the lowest part of said projections, and hence the lowest part of the knives on the right side; for when double heads are used there are only two knives on each side.

What I claim is as follows:

1. A cutter-head, having a hub, c, disk a, and with raised eccentrics b, projecting from the hub, and against which eccentrics and upon which disk the cutters are adjusted, substantially as shown and described.

2. The segmental knife A, having its cutting-edge substantially at right angles with its shank, and having a curved slot in its shank, which, when the knife is attached to the head, is parallel to the face of the eccentrics, against which the knife rests.

In testimony that I claim the foregoing as my own I affix my signature in presence of two witnesses.

PHILANDER G. FINN.

Witnesses:
JOHN J. READ,
JNO. K. HALLOCK.